Nov. 29, 1960  N. B. CHRISTENSEN  2,962,045
RELIEF VALVE
Filed April 10, 1959

INVENTOR.
NORMAN B. CHRISTENSEN
BY Hudson, Boughton,
Williams, David & Hoffman
ATTORNEYS United States Patent Office 2,962,045
Patented Nov. 29, 1960

2,962,045
RELIEF VALVE

Norman B. Christensen, North Olmsted, Ohio, assignor to Republic Manufacturing Co., Cleveland, Ohio, a corporation of Ohio Filed Apr. 10, 1959, Ser. No. 805,468
13 Claims. (Cl. 137—509)

This invention relates to relief valves for the automatic release of gaseous pressure fluid and, as one of its objects, provides a gas pressure relief valve of a simple and practical construction and one which will open automatically at a predetermined pressure and will reclose automatically at a predetermined lower pressure, the automatic reclosing of the valve being accomplished in a smooth and positive manner.

Another object is to provide a gas pressure relief valve having a valve member movable to an open position by a predetermined increase of inlet fluid pressure and also having chamber means in which pressure fluid is trapped for expansively producing, or assisting in producing, an assured reclosing actuation of the valve member.

A further object is to provide a relief valve of the character above mentioned wherein the chamber means comprises a fluid pressure differential responsive means connected with the valve member, and wherein the trapping of the expansive fluid in the chamber means is accomplished by an auxiliary or regulator valve means adapted to be automatically closed by predetermined increase of inlet fluid pressure.

Still another object is to provide a relief valve mechanism comprising a main valve automatically movable to an open position by a predetermined increase in inlet passage pressure and automatically movable to a closed position by the combined action of a spring means and expansive fluid trapped in an actuating chamber which is normally in communication with the inlet passage, and regulator valve means operable to automatically disconnect the actuating chamber from the inlet passage.

Figure 1:
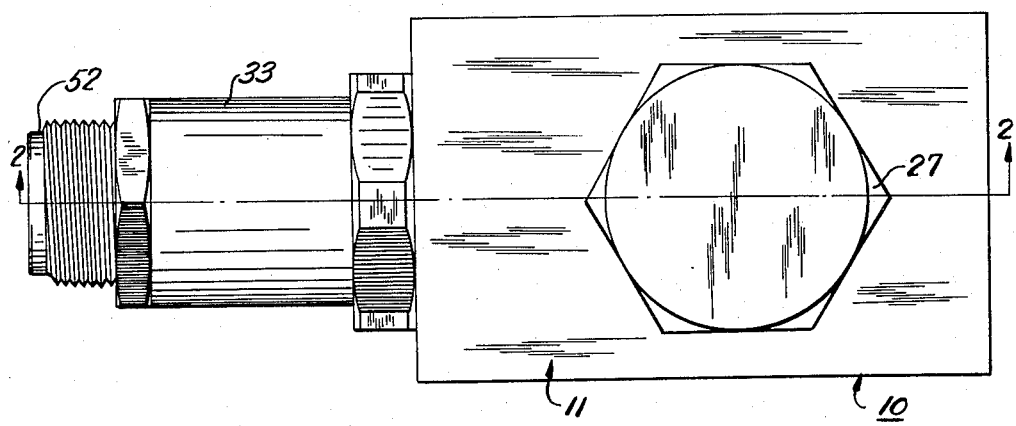
Figure 2:
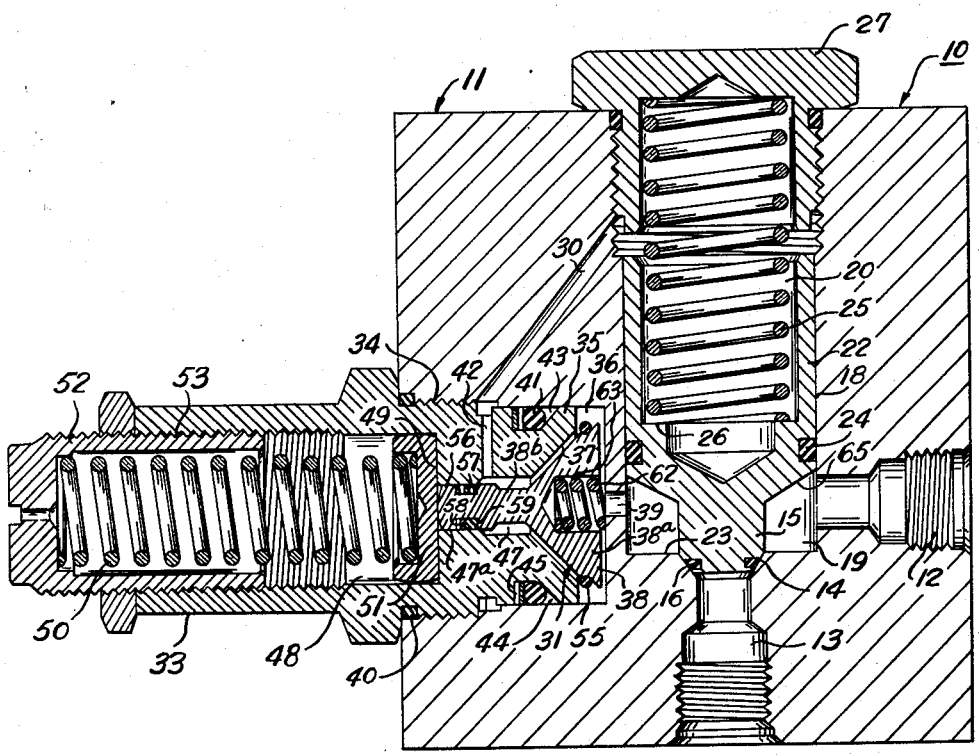

Other objects and advantages of this invention will be apparent in the following detailed description and in the accompanying drawings forming a part of this specification and in which, Fig. 1 is a top plan view of a gas pressure relief valve embodying this invention; and Fig. 2 is a vertical section taken through the relief valve on section line 2—2 of Fig. 1.

The valve device 10 of the accompanying drawings represents a practical and preferred embodiment of the gas pressure relief valve of this invention. The valve 10 comprises, in general, a body 11 having inlet and outlet passages 12 and 13 for pressure fluid, such as compressed air or other gas pressure, and an annular valve seat 14 with which a movable main valve member 15 co-operates. The valve seat 14 is here shown as being of a beveled or tapered shape and disposed in a co-axially surrounding relation to the relief passage or outlet 13. The valve member 15 is axially movable toward and away from the valve seat 14 and is provided with a suitable ring 16 for sealing the engagement of the valve member with the valve seat.

The body 11 also contains a bore 18 extending thereinto substantially coaxially with the valve seat 14 and the outlet passage 13 and which bore is divided into two chambers or fluid pressure compartments 19 and 20 by a movable pressure differential responsive means, in this case, by a plunger 22 which is slidable in the bore 18 and with which the valve member 15 is here shown as being integrally connected for direct actuation thereby. In the valve device 10 the compartment 19 is shown as being an inner or lower compartment and the compartment 20 is an expansible chamber and is an outer or upper compartment. The valve seat 16 is here shown as being formed on a portion of the inner end wall 23 of the bore 18. The plunger 22 carries a suitable packing ring 24.

The inlet passage 12 communicates with the inner compartment 19 and connects the same with the source of compressed air or other gas under pressure. The outlet passage 13 also communicates with the compartment 19 and, when the valve member 15 has been moved to open position in the manner explained hereinafter, connects such compartment with a low pressure space or with the atmosphere.

The valve member 15 is normally in a closed position in engagement with the seat 14 and is biased toward such normally-closed position by the force of a relatively light compression spring 25 located in the outer compartment 20 and by the force of the pressure fluid present in such outer compartment. The spring 25 has its inner or lower end seated against an annular shoulder 26 of the plunger 22. A closure plug 27 having threaded engagement in the body 11 closes the outer end of the bore 18 and forms a seat for the outer or upper end of the spring 25.

In accordance with the present invention, the body 11 of the valve device 10 is also provided with an equalizing or transfer passage means 30 for connecting the outer compartment 20 with the inner compartment 19 and the inlet passage 12, and which passage means is controlled by regulator valve means 31 which will be presently described. The regulator valve means 31 is normally in an open condition for supplying pressure fluid from the inlet passage 12 to the outer compartment 20 so that, when such pressure fluid is subsequently trapped in the latter compartment by the closing of the regulator valve means 31, it will be expansively effective against the plunger 22 for causing, or assisting in causing, a reclosing of the main valve member 15.

The regulator valve means 31 is here shown as comprising a hollow adapter or stem 33 having a threaded portion 34 connected with the main valve body 11 and an inner end 35 extending into a recess 36 of such main body and carrying a tapered concave annular valve seat 37. The regulator valve means 31 also comprises a reciprocably movable second or auxiliary valve member 38 co-operating with the valve seat 37 and automatically movable by a translatory shifting thereof to a closed position for disconnecting the outer compartment 20 from the inlet passage 12 and for trapping pressure fluid in such outer compartment as mentioned above.

The portion of the hollow stem 33 which extends into the recess 36 of the body 11 is provided with suitable axially spaced packing rings 40 and 41 and, at a point therealong between these packing rings, is provided with a radial passage 42 forming a part of the passage means 30 extending to the outer compartment 20. The recess 36 is in communication with the inner compartment 19 through a port 39 of the body 11. The end portion 35 is provided with an annular bevel 43 forming one of the walls of a groove 44 in which the packing ring 41 is disposed. A ring 45 of a suitable form is also disposed in the groove 44 as a back-up ring for the packing ring 41.

The hollow stem 33 is provided with an axial passage 47 extending through the end portion 35 and which passage is surrounded at its inner end by the tapered valve seat 37. The outer portion of the stem 33 is provided with a counterbore 48 having a transverse inner end wall 49 and with which counterbore the axial passage 47 is connected by a guide opening 47ᵃ formed in such end wall. The counterbore 48 forms a spring chamber for a compression spring 50 whose inner end bears against a spring seat 51 which is engageable with the end wall 49. The outer end of the spring 50 is in engagement with a spring seat 52 in the form of an adjusting sleeve having a threaded connection 53 with the stem 33 by which the compression loading of this spring can be varied.

The valve member 38 is here shown as having a head portion 38ᵃ of a tapered shape for co-operation with the tapered valve seat 37 and a stem portion 38ᵇ extending axially in the passage 47 and of a length to project beyond the transverse wall 49 when the valve member 38 is in a closed position relative to the seat 37. The valve member 38 is provided around the lip portion thereof with a suitable packing ring 55 for sealing cooperation with a portion of the valve seat 37 when the valve member has been moved to its closed position.

The stem 38ᵇ of the valve member 38 is provided at the inner end thereof with a stem portion 56 which is slidable in the guide opening 47ᵃ and carries a packing ring 57 for preventing escape of pressure fluid from the passage 47 into the counterbore 48. The packing ring 57 and an associated back-up ring 58 are located in a suitable groove 59 provided in the stem 38ᵇ.

The inner spring seat 51 is slidable in a plain or unthreaded portion of the counterbore 48 and is of a transverse dimension such that it will extend across the guide opening 47ᵃ and will seat against the end wall 49 as a stop when the valve member 38 is in its open position, as shown in Fig. 2 of the drawings. The engagement of the spring seat 51 with the end wall 49 limits the extent to which the valve member 38 can be opened by the spring 50.

The stem 38ᵇ of the valve member 38 is maintained in engagement with the spring seat 51 by a compression spring 62 which is of a relatively weaker characteristic than the spring 50. The spring 62 is here shown as being located in a recess or counterbore 63 of the valve member 38 and is seated against the portion of the body 11 which forms the inner end wall of the recess 36. The spring 62 prevents accidental displacement of the valve member 38 by maintaining the latter in engagement with the spring seat 51.

When the valve device 10 is in use the main valve member 15 is in a normally-closed position as mentioned above, and operates as a pressure differential responsive valve member automatically movable to open and closed positions by the resultant forces of the fluid pressures acting against the different areas of the plunger 22. Since the auxiliary valve member 38 is in a normally-open position, the fluid pressure of the inlet passage 12 is transmitted through the passage means 30 to the outer compartment 20. Therefore the fluid pressures in the inlet passage 12 and in the outer compartment 20 will ordinarily be the same, but the forces acting on the plunger 22 as the result of these pressures will be different because of the different areas exposed to these pressures.

As is apparent from Fig. 2, the fluid pressure in the outer compartment 20 acts on an effective plunger area which is equal to the cross-sectional area of the bore 18, whereas the inlet passage pressure in the compartment 19 acts only on the ring-shaped plunger area 65 surrounding the valve member 15. The resultant or net force is therefore normally one tending to move the valve member 15 toward its closed position and, in magnitude, is the sum of the forces produced by the spring 25 and by the pressure fluid acting against an area equal to the cross-sectional area of the valve member 15.

The regulator valve device 31 is set, by adjustment of the loading of the spring 50, so that when the pressure of the fluid in the inlet passage 12 increases to a predetermined value the auxiliary valve member 38 will be moved to a closed position relative to the seat 37. The closing of the valve member 38 disconnects or isolates the outer compartment 20 from the inlet passage 12 so that further increase in let passage pressure can be utilized to cause opening of the main valve member 15. The closing of the valve member 38 also traps pressure fluid in the outer compartment 20, as mentioned above, for use in conjunction with the spring 25 for reclosing the valve member 15.

Upon such further increase in the pressure in the inlet passage 12 to a second and higher predetermined value after the auxiliary valve member 38 of the regulator valve means 31, has been closed, the main valve member 15 will be automatically opened to thereby vent pressure fluid from the inlet passage through the outlet passage 13 to a low pressure space or to the atmosphere. In this connection it is pointed out that the higher predetermined inlet passage pressure acting against the ring-shaped area 65 will overcome the force produced by the spring 25 and by the fluid previously trapped in the compartment 20 and will be effective to cause opening of the valve member 25.

When the inlet passage pressure drops, as the result of the venting of fluid through the outlet 13, the condition of the valve device 10 returns to that at which the combined force of the spring 25 and of the pressure fluid trapped in the compartmnet 20 predominate over the force produced by the reduced inlet pressure acting against the ring-shaped area 65, whereupon the valve member 15 is returned to its closed position. This reclosing of the valve member 15 is accomplished in a smooth and positive manner and without vibration or chatter, even though the valve device 10 is designed for reclosing at an inlet passage pressure which is not greatly different from its rated relief pressure.

If the inlet passage pressure holds steady at the value at which the automatic reclosing of the main valve member 15 takes place, the auxiliary valve member 38 will remain closed. However, if the inlet passage pressure drops below the predetermined value at which the closing of the valve member 38 took place, as by reason of a drop in pressure of the fluid source, the latter valve member will be reopened by the spring 50 to reconnect the compartment 20 with the inlet passage.

From the accompanying drawings and the foregoing detailed description it will now be readily understood that this invention has provided a gas pressure relief valve of a simple and practical form which will operate in a very satisfactory and positive manner for automatically causing opening of a relief valve member at the desired predetermined pressure value, and for automatically causing reclosing of such valve member at a lower predetermined pressure value in a positive manner and without chattering thereof.

Although the valve device of this invention has been illustrated and described herein to a somewhat detailed extent, it will be understood, of course, that the invention is not to be regarded as being limited correspondingly in scope but includes all changes and modifications coming within the terms of the claims thereof.

Having described my invention, I claim:

1. A pressure relief valve comprising, a body having a gas pressure fluid passage and a relief outlet, a valve member operable in said body to control said passage and being normally in a position closing said relief outlet, means providing an expansible chamber in communication with said passage and including movable means responsive to a pressure differential between the gas fluid pressures of said passage and chamber for biasing said valve member toward its normally-closed position, and normally-open regulator valve means controlling the communication to said chamber and being automatically movable to close said communication in response to increase of the gas fluid pressure in said passage to a first predetermined value, said valve member being automatically movable by said movable means to open said relief outlet in response to the occurrence of a higher predetermined gas fluid pressure in said passage after the closing of said regulator valve means.

2. A pressure relief valve comprising, a body having a gas pressure fluid inlet passage and an outlet passage and a valve seat between said passages, said body also having a chamber therein for receiving gas pressure fluid and passage means connecting said chamber with said inlet passage, a valve member having a normally-closed position relative to said valve seat, fluid pressure differential responsive actuating means connected with said valve member and subject on opposite sides thereof to the action of the gas fluid pressures of said inlet passage and chamber, and normally-open auxiliary valve means controlling said passage means and being automatically movable to close said passage means in response to increase of the gas fluid pressure in said inlet passage to a first predetermined value, said valve member being automatically movable to open position by said actuating means in response to the occurrence of a higher predetermined gas fluid pressure in said inlet passage after the closing of said auxiliary valve means.

3. A pressure relief valve comprising, a body having a gas pressure fluid passage and a relief outlet, a valve member operable in said body to control said passage and being normally in a position closing said relief outlet, means providing an expansible chamber in communication with said passage and including movable means responsive to a pressure differential between the gas fluid pressures of said passage and chamber for biasing said valve member toward its normally-closed position, and means for closing the communication to said chamber to trap gas pressure fluid in the latter comprising a reciprocably movable second valve member shiftable to a closed position by translatory movement thereof in response to predetermined gas fluid pressure increase in said passage, said valve member being automatically movable by said movable means to open said relief outlet in response to a further predetermined gas fluid pressure increase in said passage and being automatically returnable to said closed position by said movable means in response to the expansive action thereagainst of the gas pressure fluid trapped in said chamber.

4. A pressure relief valve comprising, a body having an inlet passage for gas pressure fluid and an outlet passage and a valve seat between said passages, said body also having means providing an expansible chamber therein for receiving gas pressure fluid and passage means connecting said chamber with said inlet passage, a valve member having a normally-closed position relative to said valve seat, fluid pressure differential responsive actuating means connected with said valve member and subject on opposite sides thereof to the action of the gas fluid pressures of said inlet passage and chamber, and auxiliary valve means controlling said passage means and being movable to a closed position in response to a first predetermined increase in the inlet passage pressure of the gas fluid to thereby trap gas pressure fluid in said chamber, said valve member being operable by said actuating means in response to a further predetermined increase of gas fluid pressure in said inlet passage and reclosed in response to the expansive action of the trapped fluid.

5. A pressure relief valve comprising, a body having a flow passage for gas pressure fluid including an inlet passage portion and an outlet passage portion, a movable main valve member co-operating with a portion of said body and controlling communication between said inlet passage portion and said outlet passage portion, said body also having a chamber for receiving gas pressure fluid and transfer passage means connecting said chamber with said inlet passage portion, spring means biasing said main valve member toward a closed position, fluid pressure differential responsive means connected with said main valve member and subject on opposite sides thereof to the gas fluid pressures of said inlet passage portion and said chamber, said main valve member being normally in said closed position and being openable by the pressure differential means in response to a predetermined increase of the pressure of the fluid in said inlet passage portion, and other valve means comprising a reciprocably movable auxiliary valve member controlling said transfer passage means and having a normally open position but being automatically movable by a translatory shifting thereof to a closed position in response to an inlet pressure increase of lower value than said predetermined increase to trap gas pressure fluid in said chamber for assisting said spring means in reclosing said main valve member.

6. In a relief valve of the character described, a body having a gas pressure fluid inlet and a relief outlet, said body also having a chamber therein and a valve seat associated with said outlet, means providing an equalizing passage connecting said chamber with said inlet, a main valve member co-operable with said seat, movable actuating means operably connected with said main valve member and dividing said chamber into two pressure compartments one of which is in open communication with said inlet and the other of which is normally in communication with said inlet through said equalizing passage, and normally open regulator valve means controlling said equalizing passage and comprising a reciprocably movable auxiliary valve member automatically movable to a closed position by a translatory shifting thereof in response to a predetermined increase of gas fluid pressure in said inlet, said main valve member being normally in a position closing said outlet but being automatically movable in one direction to open said outlet in response to the action of the gas fluid pressure of said one compartment against said actuating means and automatically movable in the opposite direction to reclose said outlet in response to the action of the gas fluid pressure of said other compartment against said actuating means.

7. In a pressure relief valve, a body provided with a cylinder bore having closed outer and inner ends, a plunger movable in said bore and dividing the same into inner and outer gas pressure chambers, said body also having gas pressure fluid inlet and outlet passages connected with said inner chamber, a valve seat associated with said outlet passage, a first valve member co-operable with said seat for closing said outlet passage, a spring effective against said plunger and biasing said first valve member toward its closed position, said first valve member being automatically movable to open said outlet passage in response to predetermined gas fluid pressure increase in said inner chamber and effective against said plunger, means providing a gas transfer passage connecting said outer chamber with said inner chamber, and a second valve member controlling said transfer passage and being movable by a translatory shifting thereof between a normally-open position and a closed position, said second valve member being automatically shiftable to its closed position in response to an inner chamber gas pressure increase of lower value than said predetermined increase for trapping gas pressure fluid in said outer chamber to assist said spring in reclosing the first valve member.

8. A pressure relief valve as defined in claim 6 wherein other spring means is effective against said second valve member for holding the latter in its normally open position, and wherein adjusting means is operable to vary the effectiveness of said other spring means.

9. In a pressure relief valve, a body provided with a cylinder bore having closed outer and inner ends, a plunger movable in said bore and dividing the same into inner and outer gas pressure chambers, said body also having gas pressure fluid inlet and outlet passages connected with said inner chamber, a valve seat associated with said outlet passage, a first valve member co-operable with said seat for closing said outlet passage, a spring expansively effective against said plunger and biasing said first valve member toward its closed position, means providing a gas transfer passage connecting said outer chamber with said inner chamber, and a second valve member controlling said transfer passage and automatically movable to a closed position by predetermined increase of gas fluid pressure in said inner chamber, the closing of said transfer passage being effective to disconnect said inner chamber from said outer chamber and to trap gas pressure fluid in the latter, said first valve member being automatically movable to open said outlet passage in response to a further predetermined increase in gas fluid pressure in said inner chamber and effective against said plunger and being automatically reclosed by the expansive action of said spring and trapped fluid against said plunger when the pressure of said inner chamber is relieved through said outlet.

10. A pressure relief valve comprising, a body having gas fluid inlet and outlet passages and a valve seat between said passages, said body also having a chamber therein for receiving gas pressure fluid and passage means connecting said chamber with said inlet passage, a valve member co-operable with said valve seat, fluid pressure differential responsive actuating means connected with said valve member to actuate the same and being subject on opposite sides thereof to the action of the gas fluid pressures of said inlet passage and chamber, said valve member being biased toward a normally-closed position by the action of the gas fluid pressure of said chamber on said actuating means, adapter means connected with said body and including a spring means and a portion of said passage means, an auxiliary valve seat on said adapter means, and an auxiliary valve member co-operable with said auxiliary valve seat for controlling said passage means, said spring means being effective on said auxiliary valve member for biasing the latter toward a normally-open position, said auxiliary valve member being movable to a closed position in opposition to said spring means in response to predetermined increase of gas fluid pressure in said inlet passage to thereby disconnect said chamber from said inlet passage, the first-mentioned valve member being movable to open position by said actuating means in response to the occurrence of a higher predetermined gas fluid pressure in said inlet passage after the closing of said auxiliary valve member.

11. A pressure relief valve comprising, a body having gas fluid inlet and outlet passages and a valve seat between said passages, said body also having a chamber therein for receiving gas pressure fluid and passage means connecting said chamber with said inlet passage, a valve member co-operable with said valve seat, fluid pressure differential responsive actuating means connected with said valve member to actuate the same and being subject on opposite sides thereof to the action of the gas fluid pressures of said inlet passage and chamber, spring means in said chamber, said valve member being biased toward a normally-closed position by the action of said spring means and the gas fluid pressure of said chamber against said actuating means, adapter means connected with said body and containing a second spring means and a portion of said passage means, an auxiliary valve seat on said adapter means, and an auxiliary valve member co-operble with said auxiliary valve seat for controlling said passage means, said second spring means being effective on said auxiliary valve member for biasing the latter toward a normally-open position, said auxiliary valve member being movable to a closed position in response to predetermined increase of gas fluid pressure in said inlet passage to thereby disconnect said chamber from said inlet passage and trap gas pressure fluid in said chamber, the first-mentioned valve member being movable to open position by said actuating means in response to the occurrence of a higher predetermined gas pressure in said inlet passage after the closing of said auxiliary valve member and being reclosed by the action of the trapped fluid and the first mentioned spring means on said actuating means.

12. A relief valve as defined in claim 11 wherein said body is provided with a recess and said adapter means is connected with said body by having an inner end engaged in said recess, said auxiliary valve seat being on said inner end and spaced from the bottom of said recess, and wherein a spring seat movably supported by said adapter means and engaged by said auxiliary valve member transmits the thrust of said second spring to the latter.

13. A relief valve as defined in claim 12 wherein stop means on said adapter means limits the valve-actuating movement of said spring seat, and wherein a third spring means disposed between said bottom wall and said auxiliary valve member holds the latter in engagement with said spring seat.

References Cited in the file of this patent

UNITED STATES PATENTS

| | | |
|---|---|---|
| 2,181,428 | Grove | Nov. 28, 1939 |
| 2,270,304 | Jacobsson | Jan. 20, 1942 |
| 2,279,571 | Kaul | Apr. 14, 1942 |

FOREIGN PATENTS

| | | |
|---|---|---|
| 708,143 | Great Britain | Apr. 28, 1954 |